Patented Apr. 24, 1923.

1,452,805

UNITED STATES PATENT OFFICE.

RICHARD HERZ, OF FRANKFORT-ON-THE-MAIN, AND HANS BALHORN, OF HOCHST-ON-THE-MAIN, GERMANY, ASSIGNORS TO LEOPOLD CASSELLA & CO. GESELLSCHAFT MIT BESCHRÄNKTER HAFTUNG, A CORPORATION OF GERMANY.

DYESTUFFS CONTAINING SULPHUR AND DYEING VEGETABLE FIBERS WITHOUT A MORDANT AND PROCESS OF MAKING SAME.

No Drawing. Application filed July 25, 1922. Serial No. 577,427.

*To all whom it may concern:*

Be it known that we, RICHARD HERZ, a Prussian subject, residing at Frankfort-on-the-Main, Germany, Eysseneckstrasse 17, and HANS BALHORN, a Prussian subject, residing at Hochst-on-the-Main, Konigsteinerstrasse 27, Germany, have invented certain new and useful Dyestuffs Containing Sulphur and Dyeing Vegetable Fibers Without a Mordant and Processes of Making Same, of which the following is a full, clear, and exact description.

Products of condensation, containing in their molecule probably a thiazine nucleus, result by condensing a halogenated arylquinone with an o.aminoarylmercaptan or an obvious equivalent thereof, which during the reaction is converted into an o.aminoarylmercaptan. Those equivalents are for instance an o.aminoarylthiosulfonic acid, an o.o.dinitrodiaryldisulfide, and o.o.diaminodiaryldisulfide, a product of the reaction of disulfurdichloride on an aromatic amino compound, the transformation product of such a product obtained by the action of water and an alkali as described in British specifications Nos. 17,417 of 1914 and 18,292 of 1914.

We have found that these bodies form starting materials for a new class of very valuable dyestuffs. If they are treated in the usual manner with sulfurizing agents, particularly if they are heated with an alkaline polysulfide new coloring matters result containing more sulphur in their molecule than the original compounds and dyeing specially vagetable fibers in an alkaline sulfide bath or in the vat in various shades fast to washing, chlorine and light.

The methods of working the invention are illustrated by the following examples:

*Example No. 1.*—25 kilos of chloranil and 12.5 kilos of o.aminothiophenol or the equivalent amount of the chlorhydrate, or of the zinc salt of the o.aminothiophenol are mixed with about 20 times their weight of water, spirit, or glacial acetic acid, and the mass is then heated in a suitable vessel for some hours, whilst stirring well.

When the reaction is finished, the product of condensation is almost completely separated in the form of a dark colored powder, soluble in concentrated sulfuric acid with a red-violet color.

Analogous products result if in this example the o.aminothiophenol is replaced by the equivalent amounts of o.aniline-thiosulfonic acid or o.o.diaminodiphenyldisulfide.

20 kilos of the product of condensation, obtained as described above, are introduced in an aqueous solution of sodiumpolysulfide prepared from 40 kilos of sodium sulfide (crystals), 25 kilos of sulphur and about 100 litres of water. The whole is heated in an apparatus fitted with a reflux condenser for some time, say for instance from 50 to 80 hours, whilst stirring. When the reaction is completed, the melt is diluted with water, about 50 kilos of sodium sulfide (crystals) are added, then it is heated to the boil, and filtered. From this solution the finished dyestuff is separated in the usual manner, for instance by blowing in a current of air, or by precipitating it with acids. In a dry state it is a dark red powder, soluble in concentrated sulfuric acid with a dark blue color, soluble in an equeous sodium sulfide solution with an olive green color, soluble in an alkaline hydrosulfite solution with a yellow color. It dyes in an alkaline sulfide bath or in the vat cotton dark red shades which are distinguished by their fastness to washing, chlorine and light.

*Example 2.*—25 kilos of chloranil and 24 kilos of the product of reaction of disulfurdichloride on p.phentidine (the production of which is described in British patent specification No. 17,417 of 1914) are mixed with about 250 kilos of spirit or glacial acetic acid, and the mass is heated for some hours to 80°–100° C., whilst stirring. It is preferable to add an agent which binds the mineral acid becoming free during the reaction, for instance sodium carbonate or sodium acetate. For completely separating the product of condensation, the diluting agent is either distilled off, or, more preferably, the mass is diluted with water, whereby the separation of the intermediate product takes place. It is filtered and may then directly be used in the following process of working: In a dry state it forms a dark blue powder soluble in concentrated sulfuric acid with a pure blue color. In this reaction, instead of the product of reaction of disulfurdichloride and p.phenetidine there may be used the corresponding amount of the products of transformation obtained by treating it with water, or with an alkali, preferably in presence of a suitable reducing agent.

The production of these substances is described in British patent specification No. 18,292 of 1914, and their chemical constitution may be expressed by the following formulæ:

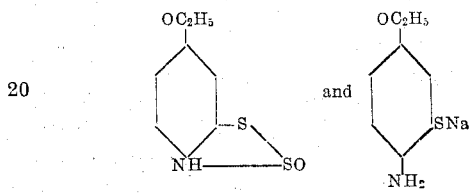

respectively. 20 kilos of the product of condensation, obtained by either of the above indicated methods, are stirred into an alkaline polysulfide solution prepared from 40 kilos of sodium sulfide (crystals), 10 kilos of sulphur and about 100 litres of water, and the mass is heated to the boil in a suitable vessel, fitted with a reflux condenser, for an extended period of time, for instance 50 to 70 hours, whilst stirring. When the reaction is completed, the almost totally separated dyestuff is filtered off and purified, if necessary by redissolving it in a hot sodium sulfide solution, filtering again and isolating it from the solution by blowing in a current of air, or otherwise. In a dry state it represents a reddish-brown powder, soluble in concentrated sulfuric acid with a blue color. It dyes cotton in an alkaline sulfide bath or in the vat claret red shades which are distinguished by their fastness to washing, chlorine and light.

By carrying out the reaction in an alcoholic solution and with an alkaline polysulfide containing a high percentage of sulphur, fuller and considerable bluer shades are obtained; if copper or copper salts are added to the melt, then redder tints are produced.

*Example 3.*—30 kilos of chloranil, or 20 kilos of dichlorbenzoquinone, are condensed with 18 kilos of 2.amino-1-thionaphtol (preferably in the form of its zinc salt) in an aqueous or alcoholic solution as indicated in the foregoing examples. The product of condensation represents in a dry state a dark colored powder soluble in concentrated sulfuric acid with a pure blue color.

The 2.amino-1-thionaphtol may be replaced by its equivalents, for instance by the product of reaction of disulfurdichloride and betanaphtylamine or by the substance produced from it by the action of water; described in the above cited British patent specifications.

30 kilos of the product of condensation, obtained by either of these methods, are introduced into a mixture of about 300 kilos of spirit, 60 kilos of sodium sulfide (conc.) and 45 kilos of sulphur, and the whole is heated in a vessel provided with a reflux condenser, or in an autoclave, for about 40 to 80 hours. The spirit is then distilled off, the separated dyestuff is filtered and freed, if necessary, from the admixed sulphur by the usual methods.

It dyes cotton in an alkaline sulfide bath, or in the vat, violet black to deep black shades which are fast to washing, chlorine and light.

Similar dyestuffs are produced if the products of condensation of chloranil and 1.amino-2-thionaphtol or benzidine-o.o.-dimercaptan (the production of which is described in Swiss patent specification No. 92,579) are subjected to the same reaction.

Having now particularly described and ascertained the nature of our said invention and in what manner the same is to be performed, we declare that what we claim is:—

1. The herein described process for the manufacture of fast cotton dyestuffs containing sulphur by subjecting the products of condensation of a halogenated arylquinone with an o.aminoarylmercaptan to the action of an alkaline polysulfide.

2. The herein described new fast cotton dyestuffs derived from the products of condensation of a halogenized arylquinone with an o.aminoarylmercaptan, by subjecting them to the action of a sulfurizing agent, containing in their molecule very probably a thiazine nucleus and besides the sulphur of the thiazine ring chemically bound sulphur, being in a dry state dark-colored powders, soluble in concentrated sulfuric acid with a violet-to a blue, to a black color and dyeing cotton in an alkaline sulfide bath, or in the vat, shades varying from claret to reddish-brown, to black which are distinguished by their fastness to washing, chlorine and light.

3. As a new article of manufacture, the herein described new fast cotton dyestuff derived from the product of condensation of chloranil with o.aminothiophenol, by subjecting the same to the action of a sulfurizing agent, containing in its molecule very probably the residue of the benzoquinone nucleus, a thiazine nucleus and besides the sulphur of the thiazine ring, chemically bound sulphur, being in a dry state a dark red powder, soluble in concentrated sulfuric acid with a dark blue color, soluble in an aqueous sodium sulfide solution with an olive green color, soluble in an alkaline hydrosulphite solution with a yellow color and dyeing in an alkaline sulfide bath or in the vat cotton dark red shades which are distinguished by their fastness to washing, chlorine and light.

4. As a new article of manufacture, the new fast cotton dyestuff derived from the product of condensation of chloranil with p.alkyloxy-o.aminothiophenol of the following formula

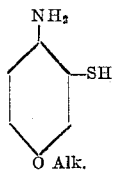

by subjecting the same to the action of a sulfurizing agent, containing in its molecule very probably the residue of the benzoquinone nucleus, a thiazine nucleus and besides the sulfur of the thiazine ring chemically bound sulphur, being in a dry state a reddish-brown powder, soluble in concentrated sulfuric acid with a blue color and dyeing cotton in an alkaline sulfide bath or in the vat claret red shades which are distinguished by their fastness to washing, chlorine and light.

In witness whereof we have hereunto signed our names this 10th day of July 1922.

RICHARD HERZ.
HANS BALHORN.

Witnesses:
BASIL E. SAVARD,
T. H. ANDERSON.